United States Patent [15] 3,700,012
Alderfer [45] Oct. 24, 1972

[54] APPARATUS FOR PRODUCING HELICALLY FORMED FILAMENTS

[72] Inventor: Sterling W. Alderfer, Akron, Ohio
[73] Assignee: The Steelastic Company, Akron, Ohio
[22] Filed: Jan. 7, 1971
[21] Appl. No.: 104,602

[52] U.S. Cl. ............... 140/149, 140/3, 156/179, 156/196, 156/298, 156/425, 156/436, 161/47, 161/144
[51] Int. Cl. ................................................. B21f 7/00
[58] Field of Search..... 140/1, 2, 92.3, 92.6, 3, 92.94, 140/102, 103, 102.5, 124, 149; 156/179, 196, 298, 425, 436; 161/47, 144

[56] References Cited

UNITED STATES PATENTS 334,450   1/1886   Mason ........................ 161/47

*Primary Examiner*—William A. Powell
*Assistant Examiner*—James J. Bell
*Attorney*—Hamilton, Renner & Kenner

[57] ABSTRACT

Helical, wire filaments are disclosed that may be encapsulated individually or nested in bundles that are themselves encapsulated within an elastomeric material to provide a reinforced fabric. The method and apparatus by which such filaments are formed pass straight wire, in individual or plural strands, through a bore in a movable working die. Each strand is cold worked around the flared orifice of the bore in the movable die and enters a corresponding bore in a fixed die means. The corresponding bores are eccentric, and the movable die plate is translated such that each bore therein describes an annular path concentrically outwardly of the corresponding bore in the fixed die means. The foregoing apparatus and method are particularly adapted to the manufacture of reinforced, elastomeric fabric, even to the point that, if desired, normally plated wire can be deplated prior to being encapsulated within the elastomer.

8 Claims, 8 Drawing Figures

PATENTED OCT 24 1972

INVENTOR.
STERLING W. ALDERFER
BY Hamilton, Cook,
Renner & Kenner
ATTORNEYS

INVENTOR.
STERLING W. ALDERFER
BY Hamilton, Cook,
Renner Kenner
ATTORNEYS

PATENTED OCT 24 1972 3,700,012
SHEET 3 OF 3
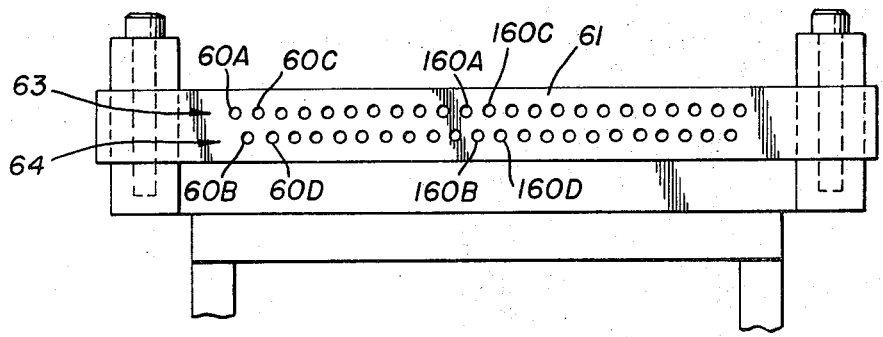
FIG. 4
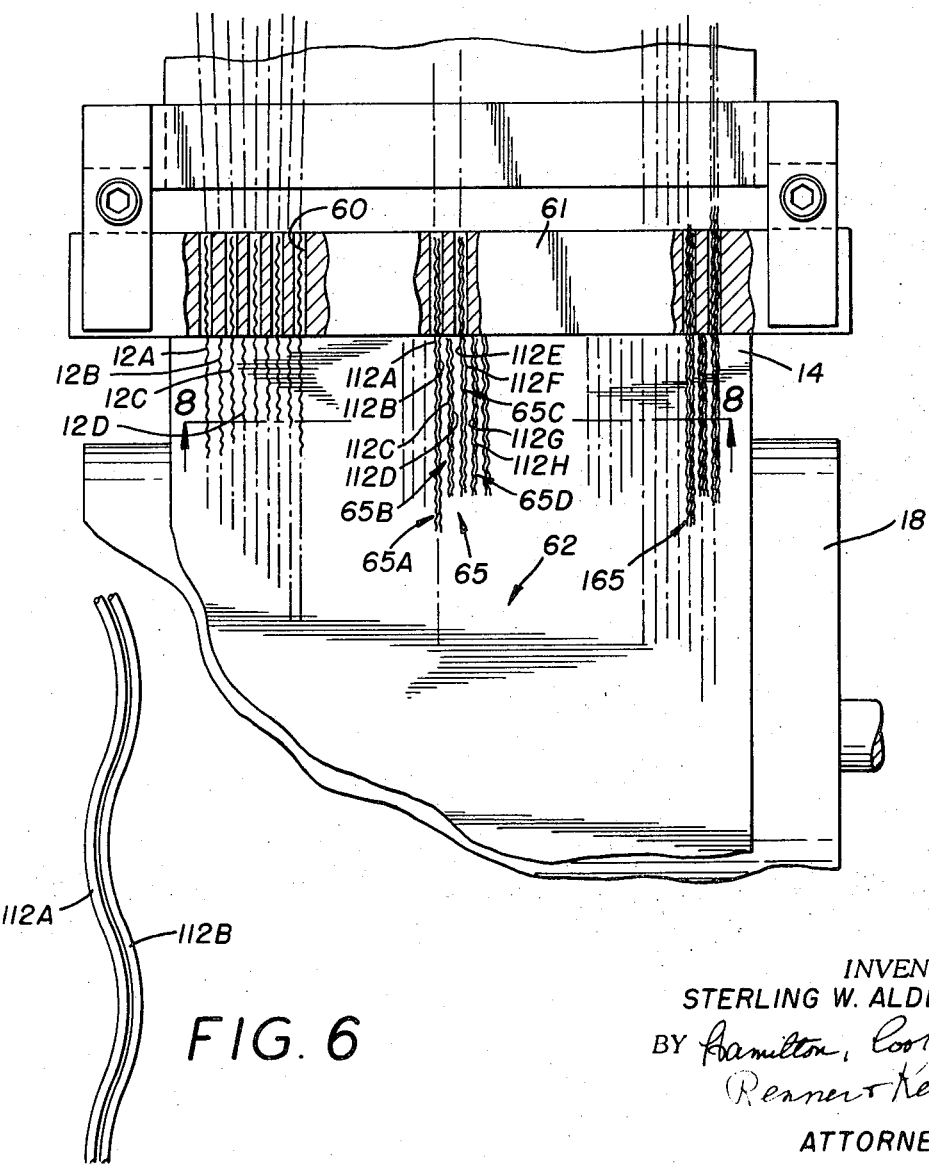
FIG. 5
FIG. 6
INVENTOR.
STERLING W. ALDERFER
BY Hamilton, Cook,
Renner & Kenner
ATTORNEYS

APPARATUS FOR PRODUCING HELICALLY FORMED FILAMENTS

BACKGROUND OF THE INVENTION

It is generally agreed that the most desirable characteristics for a reinforcing material to be used with elastomeric fabric and mechanical rubber products such as tires and conveyor belts are: high tensile strength, low elongation, dimensional stability, high temperature resistance and absence of thermal shrinkage. The only material that possesses all the foregoing physical properties and yet is neither beleaguered by compression stresses nor has a yield point uncomfortably close to its ultimate strength (as does glass fiber reinforcing is steel wire.

It has long been deemed necessary to weave, or twist, multiple wire filaments into cables in order to achieve even minimally acceptable flexibility of the fabric reinforced thereby without fatiguing the wire through constant bending. This cabling of the wire has also been deemed necessary to permit the controlled degree of elastic elongation desirable to avoid straining the wire beyond its elastic limit as the tire within which it is incorporated engages irregularities in the roadway over which it travels.

Unfortunately, the cabling of wire adds an inordinate cost to the use of steel wire reinforcing in elastomeric fabric and has, at least to some degree, diminished the measure of flexibility associated with comfortable ride characteristics. In an effort to alleviate this expense and soften the ride, the prior art includes at least one attempt to employ a single wire strand within a circumferential breaker belt interposed between the carcass and the tread. According to this prior art teaching the wire was oriented substantially circumferentially of the tire and was crimped to provide sinuous undulations along the length thereof so as to be capable of at least partial straightening out to provide an increase in the circumferential dimension of the belt during shaping and curing of the tire, and, if desired, a further modicum of elasticity to the cured tire without cabling. However, if the wire is completely straightened, the elastic limit may be too easily exceeded, and if the wire is not completely straightened, repeatedly extending the circumferential dimension of the wire by flexure of the undulations results in repeated bending stresses along the circumference that tend to fatigue the wire and induce premature failure. In addition, the crimped wire reinforcing was highly subject to flexural fatigue induced by bending stresses, oriented transversely of the wire convolutions (i.e., radially) largely because the undulations, at any given point along any given undulation, lay in a plane oriented tangentially to the convolution. Moreover, these bending stresses are not readily dissipated, because the crimped reinforcing filament was wound continuously through a plurality of convolutions about the circumference of the tire and therefore at no more than a small angle to a radial reference plane perpendicular to the rotational axis of the tire.

With this background an uncabled wire reinforcing filament was developed that possesses a configuration by which desirable flexibility without premature failure can be achieved and at the same time does not detract from the physical attributes appreciated as being afforded by wire. The helical configuration of this reinforcing filament — thereby accommodating the stresses to which it is subjected partially by torsion and partially by bending — and the apparatus by which wire may be so formed are clearly disclosed in my copending application, Ser. No. 858, filed on Jan. 6, 1970.

SUMMARY OF THE INVENTION

It is, therefore, a primary object of the present invention to provide an improved apparatus for forming wire into fabric reinforcing filaments the helical path of which possess uniformly precise diameter and lead.

It is another object of the present invention to provide an improved apparatus, as above, that may readily be incorporated as one component of a system for making reinforced elastomeric fabric.

It is a further object of the present invention to provide an apparatus, as above, for forming bundles of two or more helical filaments that are nested, but not cabled, in order that each filament in a bundle may elongate when subjected to tensile forces without restrictively engaging the other filaments in the bundle.

It is a still further object of the present invention to provide a method for helically forming reinforcing filaments, as above, and for incorporating said reinforcing filaments into elastomeric fabric.

It is an even further object of the present invention to provide an elastomeric fabric reinforced by bundles of nested, helical filaments.

These and other objects, together with the advantages thereof over existing and prior art forms which will become apparent from the following specification, are accomplished by means hereinafter described and claimed.

In general, reinforcing filaments according to the concept of the present invention delineate a helix. Such filaments may be individually encapsulated within an elastomeric material to reinforce the resulting fabric, or a plurality of such helical filaments may be loosely juxtaposed to form bundles of nested individual filaments, the bundles themselves being encapsulated within an elastomeric material. The employment of bundles not only accomplishes an increase in the effective cross section of the reinforcing material for a given section of fabric but also does so by the use of individual filaments of sufficiently small cross section to avoid the fatigue and heat retention incident to single reinforcing filaments of comparable cross section.

Bundles of individual helical wires thus afford the positive benefits heretofore associated with cabled wire, and, in addition, permit a much greater degree of elasticity axially of the bundle, because the individual filaments are not cabled and can, therefore, separately extend as a function of a reduction in the diameter of the helix and a correlative extention in the pitch of the helix without restrictive engagement between any of the filaments in the bundle, as is the situation with cabled strands.

Individual filaments, or bundles of individual filaments, are helically formed with great facility by passing straight wire through a bore and flared orifice in a working die plate, working the wire by bending it at the orifice to pass through a corresponding bore in a fixed die means located eccentrically of the bore in the working die plate and translating the working die plate such that the bore therein describes an annular locus of points concentrically outwardly of the corresponding bore in the fixed die means.

Selection of: the degree of eccentricity between the corresponding bores in the working die plate and the fixed die means; the rate at which the working die plate is translated; and, the rate at which the wire travels between the aforesaid bores will determine the diameter and pitch of the helix formed by the wire.

The helical filaments, individually or in bundles, are then encapsulated within an elastomeric material to provide a reinforced fabric particularly suited, for example, to be used as tire plies. For such use high carbon steel wire is generally preferred, and while such wire is almost uniformly plated with a corrosion resistant metal, such plating may not be needed to enhance the adhesion between the wire and the elastomeric material in which the wire is encapsulated. Accordingly, the wire may be electrolytically deplated before being incorporated within the fabric.

A preferred embodiment of the helical reinforcing filament and two alternative bundles of such filaments are shown, together with the preferred apparatus by which such embodiments can be formed according to the article, apparatus and method concepts of the subject invention, by way of example in the accompanying drawings and are described in detail without attempting to show all of the various forms and modifications in which the invention might be embodied; the invention being measured by the appended claims and not the details of the specification.

DESCRIPTION OF THE DRAWINGS

FIG. 4 is an enlarged frontal elevation of the guide block taken substantially on line 4—4 of FIG. 1;

FIG. 5 is an enlarged top plan of the helically formed filaments passing through the guide block (partially broken away) and onto an elastomeric strip just prior to the time it enters the bight of the rolls by which the filaments are sandwiched between elastomeric strips;

FIG. 6 is a further enlarged area of FIG. 5 depicting two helically formed filaments in nested juxtaposition;

DESCRIPTION OF THE PREFERRED EMBODIMENT

Figure 1:
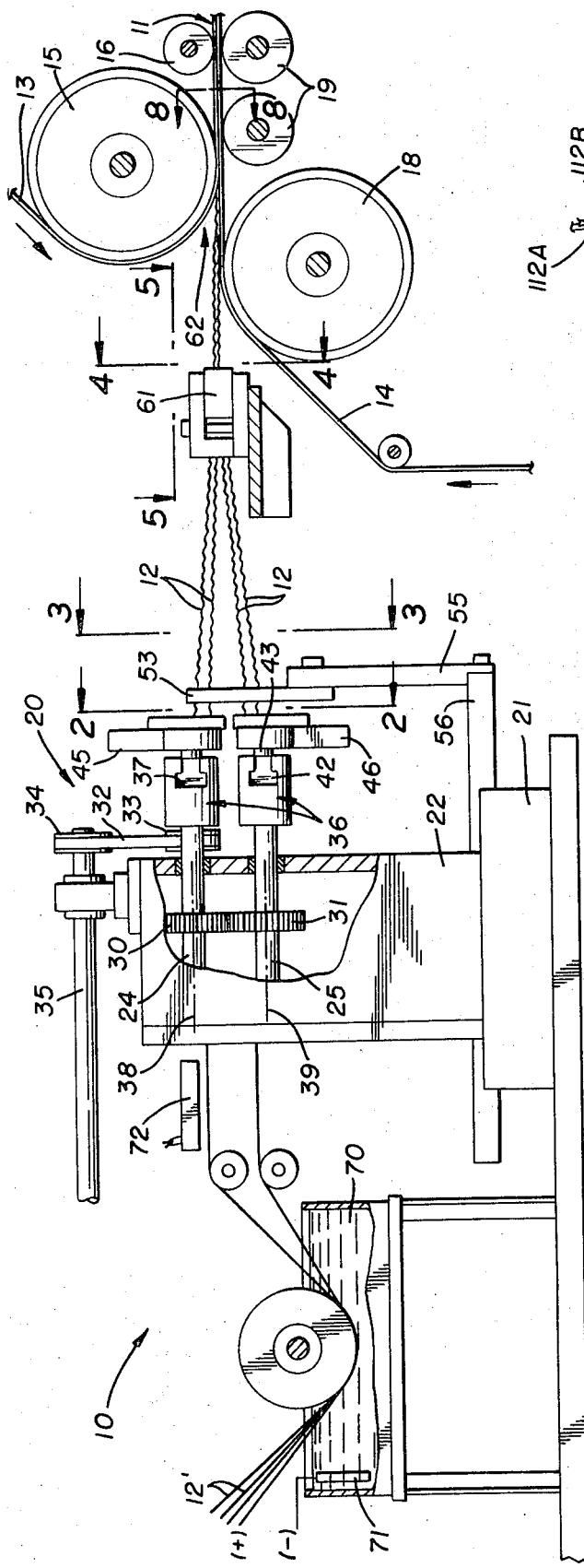
FIG. 1 is a schematic, side elevation of a system for making reinforced fabric of the type employed in tires, said system including apparatus for forming straight wire into reinforcing filaments of helical disposition.

Referring more particularly to the drawings, the apparatus designated generally by the numeral 10 is particularly suited for making reinforced elastomeric fabrics of the type used in tire plies and belting. The form of the apparatus 10 depicted produces a ribbon 11 of fabric by sandwiching a plurality of helically formed wire filaments 12 between two strips 13 and 14 of an elastomeric material such as rubber.

Upper guide and pressure rolls 15 and 16, respectively, are disposed in suitable opposition to lower guide and pressure rolls 18 and 19, respectively, to sandwich and embed the filaments 12 into the opposed strips 13 and 14 and thereby produce the ribbon 11. The filaments 12 could, however, as well be encapsulated within the elastomeric body of the ribbon by feeding the filaments emanating from the filament forming, or working, mechanism 20 into an extruder head, not shown. By either approach the resulting ribbon of fabric can be incorporated in tire plies, for example, according to the concept taught in my aforesaid U.S. application, Ser. No. 858.

Figure 2:
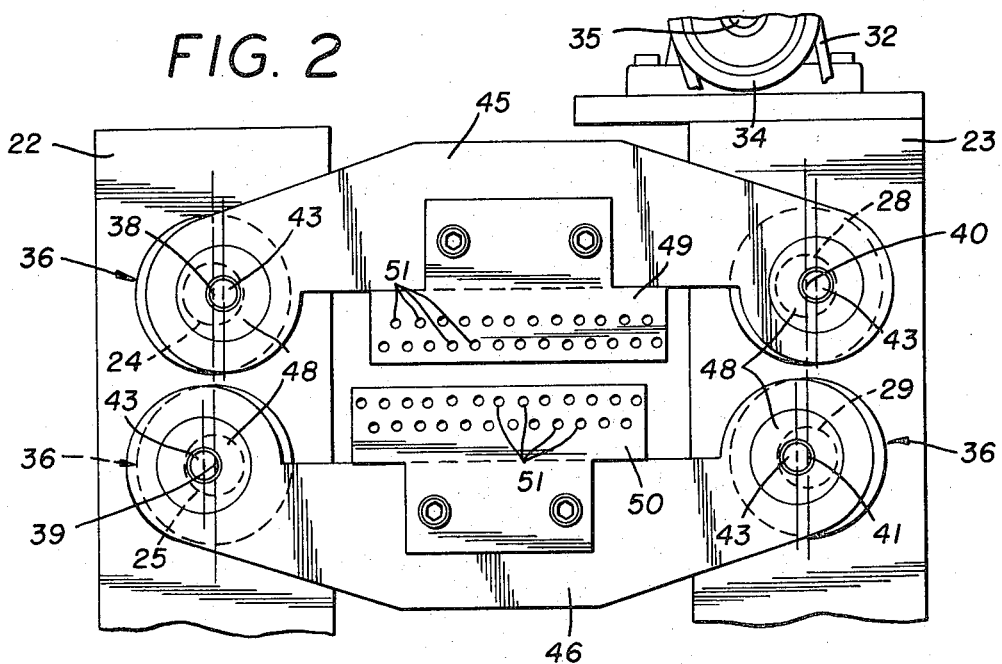
FIG. 2 is enlarged section taken substantially on line 2—2 of FIG. 1 and depicting the movable, working die plates and the cross beams on which they are mounted in frontal elevation.
Figure 3:
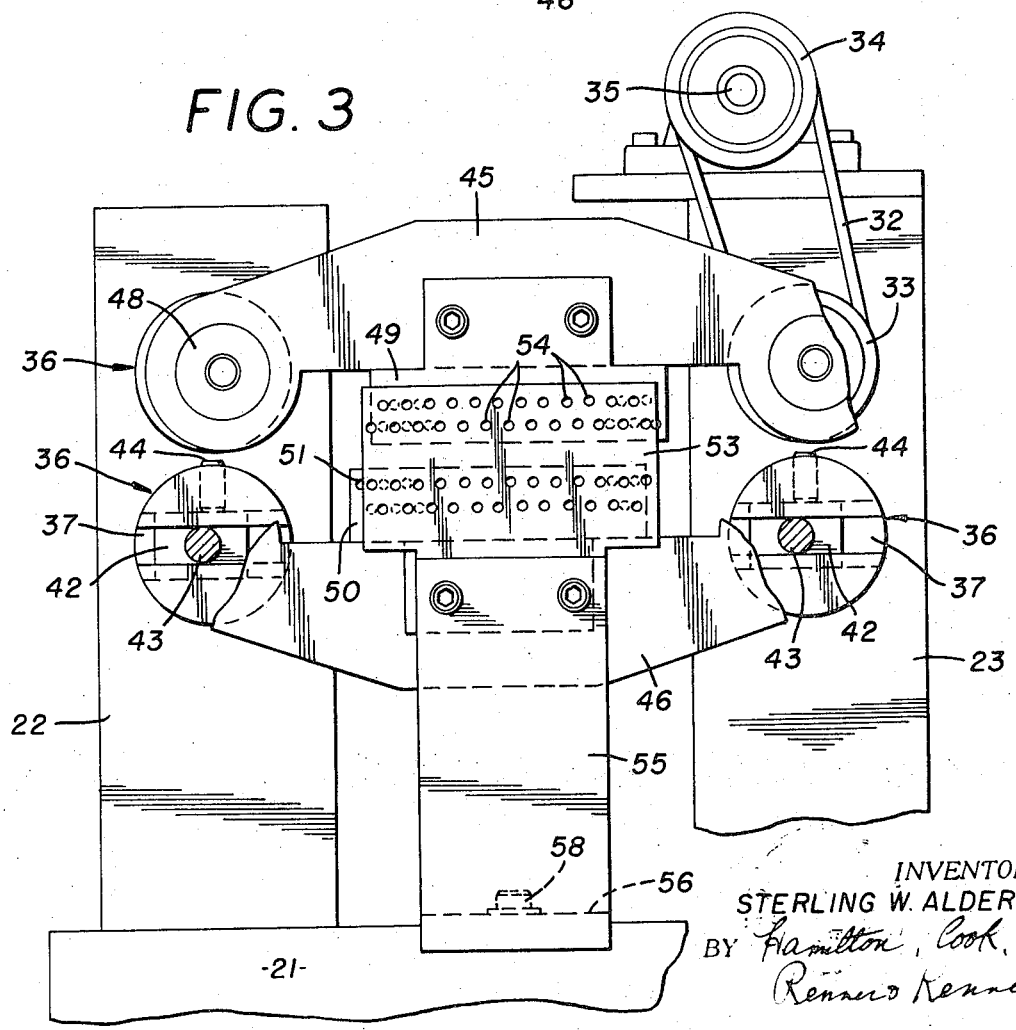
FIG. 3 is a view similar to FIG. 2 but taken substantially on line 3—3 of FIG. 1 and depicting the fixed die plate in frontal elevation with the movable, working die plates therebehind, one of which is partly broken away.

The forming mechanism 20 embodies a unique concept and constitutes an improvement over the twisting mechanism disclosed by the aforesaid copending application. As best shown in FIG. 1, the forming mechanism is mounted on a base 21. A pair of laterally spaced, support housings 22 and 23 (FIG. 2) extend upwardly from the base 21. A pair of parallel spindles 24 and 25 are journaled in housing 22, and a corresponding pair of parallel spindles 28 and 29 are journaled in housing 23. In order to effect rotation of the spindles 24 and 25 in opposite direction they are interconnected by a gear means within the housing 22. As shown, a spur gear 30 secured to spindle 24 may be meshingly engaged with a spur gear 31 secured to spindle 25. The spindles 28 and 29 are also preferably interconnected by a gear train to effect opposite rotation and to balance the transmission of the rotational force supplied to the spindle 28 by the belt 32 that passes between the pulley 33 secured to spindle 28 and a pulley 34 secured to a drive shaft 35.

Individual adjusting heads 36 are secured to the end of each spindle 24, 25, 28 and 29. The adjusting heads 36 are each provided with a T-slot 37 that extends transversely of the parallel axes 38, 39, 40 and 41 about which the respective spindles rotate. For a purpose more fully hereinafter explained, the T-slots 37 in the adjusting heads 36 secured to spindles 24 and 28 are oriented to remain parallel during rotation of those spindles; similarly, the T-slots 37 in the adjusting heads 36 secured to spindles 25 and 29 are also oriented to remain parallel.

A key 42 is slidably received within the T-slot 37 of each adjusting head 36 to permit selection of the eccentricity at which a stud 43 secured to each key 42 is presented with respect to the rotational axis of the spindle upon which the head 36 carrying that stud 43 is rotated. After the key 42 is positioned in its selected location it is maintained against further sliding within the T-slot 37 by one or more locking means such as the socket head screws 44.

An upper cross beam 45 is carried on the eccentric studs 43 rotated by spindles 24 and 28, and a lower cross beam 46 is carried on the eccentric studs 43 rotated by spindles 25 and 29. Suitable bearings 48, secured to the cross beams, are interposed between each eccentric stud 43 and the respective cross beams 45 and 46. The distance between the bearings 48 on each cross beam exactly equals the span between the rotational axes of the spindles operatively connected to that cross beam by way of the adjusting heads 36 and studs 43. Thus, as the spindles rotate, the locus of points delineated by any point on the cross beams describes a circle having a radius equal to the eccentricity of the studs 43 on which that cross beam is carried with respect to the rotational axis of the spindles to which those studs are operatively connected.

A first, working die plate 49 is affixed to the upper cross beam 45 to be movable therewith, and a similar second, working die plate 50 is affixed to the lower cross beam 46 to be movable therewith. Each movable die plate is penetrated by a plurality of bores 51, each of which flare into a forming orifice 52 on what shall be identified as the "downstream" side of the bore 51 by reference to the direction in which the wire moves through the bore 51 to be formed, as is hereinafter more fully described.

The two, movable die plates 49 and 50 preferably translate in a common plane parallel to, and spaced from, the plane of a selectively locatable, fixed die plate 53. The fixed die plate is penetrated by a plurality of bores 54 preferably equivalent in number to the combined number of bores 51 in the two, movable die plates 49 and 50. In order to insure uniformity in the degree to which each wire is helically formed by the mechanism 20, it is important that the geometric orientation of the bores through the two movable die plates 49 and 50 conform to the orientation of the corresponding bores 54 through the fixed die plate 53, and, in fact, be oriented such that upon translation of the two movable die plates 49 and 50, the bores 51 in each of said movable die plates will describe an annular path concentrically outwardly of the corresponding bore 54 in the fixed die plate 53 — the radius of the annular path being equal to the eccentricity pre-established by selective location of the keys 42 along their respective T-slots 37. When multiple bores are employed through each movable die plate, conformity in the geometric orientation of the bores in the movable die plate with the corresponding bores in the fixed die means can only be achieved if the T-slots associated with the individual cross beams are parallel, as described above.

Selectively locating the fixed die plate 53 is accomplished by supporting the die plate 53 on a tail stock 55 secured to a carriage member 56 slidably received on the base 21 and selectively positionable by a locking nut 58 to control the spacial separation of the fixed die plate 53 with respect to the two, movable, working die plates 49 and 50.

Straight wire is pulled through each of the bores 51 extending through the working die plates 49 and 50 and engages the curvature of the flared forming orifice 52 associated with each bore 51 in a rather tight bend to pass through the corresponding bore 54 in the fixed die plate 53. The bend of the wire around the flared orifice 52 forms, or works, the wire, and, because the working plate is translated as the wire moves axially through the working plate, the wire is formed into a helical configuration. By varying the eccentricity of the corresponding bores 51 and 54, the speed at which the working die plates are translated with respect to the fixed die plates and the speed at which the wire traverses the two bores, one can precisely control the dimensions (diameter and pitch) of the helix formed in the filament passing through the twisting mechanism 20. Because the wire is cold worked in the above-described manner, the wire will assume a helical set elastically opposing any change in its helical dimensions.

By flaring the orifice 52 around which the wire passes as it leaves bore 51 and by similarly flaring the orifice 59 around which the wire passes as it enters bore 54, even though the wire will be worked the exterior surface of the wire will not be nicked or otherwise abraded.

Figure 7:
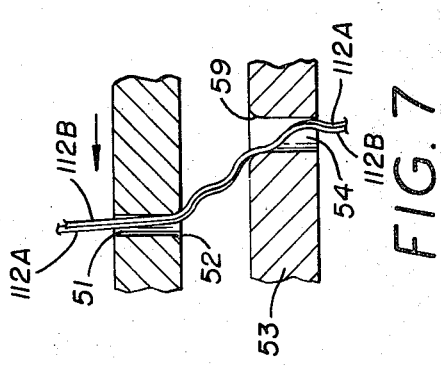
FIG. 7 is an enlarged cross section, appearing on the same sheet of drawings as FIG. 1, taken through a forming orifice in one of the movable working die plates and a corresponding bore in the fixed die plate which depicts the disposition of a wire filament being formed as it passes therebetween; and, FIG. 8 is an enlarged cross section, appearing on the same sheet of drawings as FIGS. 1 and 7, taken substantially on line 8—8 of FIG. 1 and depicting typical disposition of helically formed wire reinforcing filaments as they may be employed in a fabric, the nature of the dispositions depicted conforming to the dispositions progressively represented along line 8—8 of FIG. 5.
Figure 8:
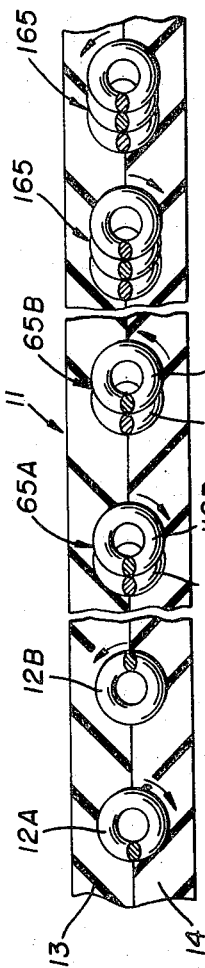

Precise spacial separation of the fixed die plate 53 and the two movable forming die plates 49 and 50 in conjunction with the degree to which the wire is helically coiled prevents any unnecessary or undesirable working of the wires as it passes around the flared orifice 59 at the mouth of bore 54. As depicted in FIG. 7, the separation of the fixed plate from the movable plate is preferably equal to one and one-half times the lead of the helix. In that way the helix will screw past the orifice 59 of bore 54 without permanently deforming the helix previously formed or otherwise unnecessarily working the wire.

Translation of the working die plates 49 and 50 in opposite directions form helices of one hand through die plate 49 and of the opposite hand through die plate 50. Filaments of opposite hand may, as disclosed in my copeneding application, SEr. No. 858, be suitably alternated to stabilize the "nerve" between filaments of opposite hand and thereby provide a more pliable fabric.

As shown on the left-hand portion of FIG. 5, the filaments 12A, 12B, 12C, etc., are individually twisted into their helical configuration and are passed through individual apertures 60 in a guide block 61 located in proximity to the bight 62 formed as the two elastomeric strips 13 and 14 are brought into juxtaposition. By this arrangement the adjacent filaments will be laterally spaced as they enter the bight 62 for embedment between the two strips 13 and 14 so that they may well be of opposite hand. Specifically, the filaments 12A, 12C, etc., could be formed through the action of the upper, moving die plate 49 and passed through adjacent apertures 60A, 60C, etc., located in the upper row 63 of apertures, as depicted on FIG. 4. At the same time, filaments 12B, 12D, etc., could be twisted through the action of the lower, moving die plate 50 and passed through adjacent apertures 60B, 60D, etc., in the lower row 64 of apertures.

As represented in the middle portion of FIG. 5, the adjacent filaments need not be laterally spaced but may be nested in bundles 65 of, for example, two filaments 112A, 112B, 112C and 112D, etc. It must be appreciated that according to this arrangement the contiguous filaments in each bundle are not cabled together but merely interfit in nested juxtaposition. The filaments of each bundle may be individually formed and then nested, or, if desired, the filaments of each bundle may be simultaneously formed into their helical configuration through the same bore in the working die plate. The only restriction is that the filaments in each bundle must be of the same hand. For example, to utilize two-filament bundles, a pair of wires may be passed through each bore 51 of the first working die plate 49 and the corresponding bore 54 in the die plate 53 to form filaments 112A and 112B, 112E and 112F, etc. of one hand nested as bundle 65A, 65C, etc. At the same time a pair of wires would be passed through each bore 51 in the second, working die plate 50 and the corresponding bore 54 in the fixed die plate 53 to form filaments 112C and 112D, 112G and 112H, etc., of the opposite hand nested as bundles 65B, 65D, etc. By alternating bundles 65A, 65C, etc., of a common hand with bundles 65B, 65D, etc. of opposite hand, the "nerve" is stabilized to assure the desired pliability of the fabric in which the bundles are incorporated.

Specifically, the bundles 65A, 65C, etc. may be formed by the action of the first, moving die plate 49 and passed through the consecutive apertures 160A, 160C, etc. in the upper row 63 of apertures, whereas, the bundles 65B, 65D, etc., may be formed by the action of the second, moving die plate 50 and passed through the consecutive apertures 160B, 160D, etc., in the lower row 64 of apertures.

When the filaments are to be bundled, they may be individually, or simultaneously, formed, and even when simultaneously formed the filaments in each bundle are not cabled or otherwise wound together by the action of the forming mechanism 20. Thus, if the filaments 112 comprising each bundle are parallel and distinct as they enter the forming mechanism 20, they will exit parallel and distinct, although, after they are helically formed, the parallel and distinct disposition is more lucidly described as being a bundle in which the individual filaments lie in nested juxtaposition.

It may also be desired to form successively adjacent three-filament bundles 165 (or bundles of even a greater number of filaments) of opposite hand. As described above in conjunction with the formation of two-filament bundles, this disposition of the bundles may well be accomplished by forming successive bundles alternately through die plates 49 and 40.

It should be appreciated that by affording the opportunity to choose either bundles of nested filaments or individual filaments, a considerably wider latitude is afforded for selecting both the flexibility and the load carrying capabilities in a given section of fabric. Specifically, the modulous of elasticity and the tensile strength can be regulated by proper selection not only of the diameter of the filaments and the particular material from which they are made but also of the dimensions for the helix into which the filaments are formed and the disposition of the filaments, individually or in bundles, within the fabric.

For example, by nesting the filaments the effective cross section of the reinforcing material can be compounded, or, by selection of the number of filaments to be nested relative to the cross section of those filaments, relatively large effective cross sectional equivalence can be achieved with filaments of smaller individual cross section that are individually more flexible and definitely more resistant to flexural fatigue.

Inasmuch as even the nested filaments comprising a bundle are relatively loosely associated, the elastomeric material in which the filaments are encapsulated can penetrate between and around the filaments to improve the mechanical bond therebetween. Most important, the exceptional elasticity afforded by bundling, as distinguished from cabling, affords greater flexibility, increased elasticity, greater fatigue resistance and improved cut resistance to the multi-filament reinforcing arrangement.

Particularly when the fabric 11 is to be employed in tire plies the adhesion between the filaments and the elastomeric material of the fabric is quite important. With the helical configuration imparted to the filaments by the forming mechanism 20, an excellent mechanical bond is achieved. In addition, of course, it is desirable to assure the best possible chemical adhesion between the filaments and the elastomeric material. According to the present state of the art it is almost a universal practice to coat wire reinforcing material intended for embedment in an elastomeric body. This practice originated in the tire industry because the historically poor quality of the rubber compound readily permitted access of moisture to the wire. As such, the coatings were primarily intended to preclude corrosion, although a number of coatings — notably tin and zinc — afforded such poor adhesion for rubber that their usage was foregone in favor of protective coatings that also possessed good adhesion characteristics. Because rubber adheres best to copper and its alloys, brass and bronze, and because those materials are corrosion resistant, they have been almost universally adopted as the accepted finish for wire reinforcing in the tire industry.

The applicant has found that modern day rubber compounds are generally of such high quality that they do prevent the migration of moisture to the wire and do adhere quite well to bare steel wire if the surface of the wire is clean and dry. Thus, the metallic coating traditionally applied to steel reinforcing wire for tires may well be salvaged, particularly if the forming mechanism 20 is efficiently utilized.

Specifically, the straight wire that one would generally acquire for use as a tire reinforcement is normally plated with one of the afore-described metallic coatings, if for no other purpose than to protect the wire against corrosion between the time it is drawn and the time it is incorporated in a tire. Additionally, of course, these protective coatings are often applied before the wire passes through the final dies because many serve as a lubricant between the steel of the wire and the steel of the die.

In any event, it has been found that if the coating is salvaged from the filaments by a device operated in close association with the subject apparatus 10 the bare wire filaments will be buried within the elastomeric material before any deleterious corrosion can occur. A preferred method for recovery of the coating metal is by an electrolytic process. That is, the coated wires 12' are passed through an electrolyte 70 (FIG. 1) suitable for the particular coating. The coated wires 12' are suitably connected (by means not shown) to a source of electrical current so as to comprise a plurality of anodes within the electrolyte. A cathode 71 is also immersed within the electrolyte remote from the anodes, and the current applied to the anode wires 12' is selected in relation to the speed at which the wires 12' pass through the electrolyte in order to assure that the metallic coating will be completely stripped from the wire. Provision should also be made occasionally to replace the cathode inasmuch as the plating metal removed from wires 12' will deposit on the cathode 71.

In order to assure that the wire filaments 12 are completely dry before they are embedded within the elastomeric body of the fabric 11, it may be highly desirable to pass them through a heating zone, represented by the heating lamp 72, after they leave the electrolyte 70.

In any event it should now be apparent that helical reinforcing filaments embodying the concept of the present invention can be made on novel apparatus and according to a novel method, either singly or in bundles, for incorporation in an elastomeric body to form a fabric having not only improved flexibility and elasticity but also reduced susceptibility to fatigue.

What is claimed is:

1. A wire forming mechanism comprising, a first, working die plate and a fixed die means, said working die plate located in spaced relation with respect to said fixed die means, said working die plate being movable with respect to said fixed die means while remaining in constant spaced relation with respect thereto, at least one bore extending through said working die plate and presenting a flared aperture in opposition to said fixed die means, a bore extending through said working die plate, each bore in said working die plate being located eccentrically of a corresponding bore in said fixed die means.

2. A wire forming mechanism, as set forth in claim 1, in which said first working die plate is mounted on a first cross beam, means mounting said cross beam for translation such that the locus of points delineated by any point on the cross beam during movement thereof describes a circle.

3. A wire forming mechanism, as set forth in claim 2, in which the movement of said cross beam is occasioned by at least one, rotating, driving spindle, an adjusting head secured to rotate with said spindle, an eccentric connection securing said cross beam to said adjusting head.

4. A wire forming mechanism, as set forth in claim 2, in which a second cross beam mounts a second working die plate, said second working die plate also being mounted in spaced relation with respect to said fixed die means, at least one bore extending through said second working die plate and presenting a flared aperture in opposition to said fixed die means, a bore extending through said fixed die means corresponding to each bore through said second working die plate, means mounting said second cross beam for translation such that the locus of points delineated by any point on said second cross beam during movement thereof also describes a circle.

5. A wire forming mechanism, as set forth in claim 4, in which the movement of said first and second cross beam is occasioned by individual, rotating driving spindles, an adjusting head is secured to each said driving spindle, and an eccentric connection secures each said cross arm to its respective adjusting head.

6. A wire forming mechanism, as set forth in claim 5, in which means are provided to rotate said driving spindles in opposite directions.

7. A wire forming mechanism, as set forth in claim 5, in which each said spindle has a rotational axis and said eccentric connection comprises a T-slot in each adjusting head extending transversely of the rotational axis of the spindle to which said adjusting head is secured, a key rotatably supported on said cross beam and slidably received in said T-slot, means to lock said key in selective eccentricity with respect to the rotational axis of said spindle.

8. A wire forming mechanism, as set forth in claim 6, in which each key is rotatably supported on its corresponding cross arm by a stud secured to each key and a corresponding bearing mounted on each cross arm, said studs being journaled within the corresponding bearings.

* * * * *